(12) United States Patent
Chang et al.

(10) Patent No.: US 12,475,370 B2
(45) Date of Patent: Nov. 18, 2025

(54) SYSTEM AND METHOD FOR AUTOMATING DESIGN OF SOUND SOURCE SEPARATION DEEP LEARNING MODEL

(71) Applicant: IUCF-HYU (INDUSTRY-UNIVERSITY COOPERATION FOUNDATION HANYANG UNIVERSITY), Seoul (KR)

(72) Inventors: Joon-Hyuk Chang, Seoul (KR); Joo-Hyun Lee, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 639 days.

(21) Appl. No.: 17/885,128

(22) Filed: Aug. 10, 2022

(65) Prior Publication Data
US 2023/0359885 A1 Nov. 9, 2023

(30) Foreign Application Priority Data
May 9, 2022 (KR) .................. 10-2022-0056452

(51) Int. Cl.
*G06N 20/00* (2019.01)
*G06N 3/08* (2023.01)
*G10L 21/0308* (2013.01)
(52) U.S. Cl.
CPC ............ *G06N 3/08* (2013.01); *G10L 21/0308* (2013.01)
(58) Field of Classification Search
CPC ........ G06N 3/08; G06N 3/0455; G06N 3/092; G06N 3/0464; G06N 3/0985; G10L 21/0308; G10L 21/0272; G10L 25/30

USPC .......... 706/12, 14, 15, 20, 25; 707/609, 693, 707/706, 708, 714, 718, 722, 741, 707/999.003
See application file for complete search history.

(56) References Cited

U.S. PATENT DOCUMENTS

| 2019/0066713 | A1 | 2/2019 | Mesgarani et al. |
| 2021/0173614 | A1* | 6/2021 | Shin .................. G06V 20/40 |

(Continued)

FOREIGN PATENT DOCUMENTS

| CN | 112989107 A | * | 6/2021 | ............. G06N 3/045 |
| KR | 20190100117 A | * | 8/2019 | ......... G10L 21/0364 |

OTHER PUBLICATIONS

Author: Noda et al., Title: Sound Source Separation for Robot Audition using Deep Learning, Date: Nov. 2015, Publisher: IEEE, pp. 389-394.*

(Continued)

*Primary Examiner* — Md I Uddin
(74) *Attorney, Agent, or Firm* — Sughrue Mion, PLLC (57) ABSTRACT

Disclosed are a system and method for automating the design of a sound source separation deep learning model. A method of automating a design of a sound source separation deep learning model, which is performed by a design automation system, may include automatically searching for a combination of hyper parameters of a separation model constructed in a sound source separation deep learning model by using a neural architecture search (NAS) algorithm and reconstructing the sound source separation deep learning model based on the retrieved combination of the hyper parameters of the separation model.

9 Claims, 10 Drawing Sheets

(56) References Cited

U.S. PATENT DOCUMENTS

2021/0224319 A1\* 7/2021 Ingel ............... G06F 16/686
2024/0013800 A1\* 1/2024 Mesgarani ........... G10L 25/30

OTHER PUBLICATIONS

Liu, et al., "DARTS: Differentiable Architecture Search", ICLR, arXiv: 1806.09055v2 [cs. LG], Apr. 23, 2019 (13 pages).

\* cited by examiner

| Epoch 40 mixed edge | | |
|---|---|---|
| Mix(MBConv1d_P5_H4, 0.260) | Mix(MBConv1d_P5_H4, 0.262) | Mix(MBConv1d_P5_H4, 0.255) | Mix(MBConv1d_P3_H4, 0.266)
| Mix(MBConv1d_P5_H4, 0.289) | Mix(Zero, 0.325) | Mix(MBConv1d_P5_H4, 0.299) | Mix(MBConv1d_P3_H4, 0.284)
| Mix(MBConv1d_P5_H4, 0.281) | Mix(MBConv1d_P3_H4, 0.293) | Mix(MBConv1d_P3_H4, 0.262) | Mix(MBConv1d_P5_H4, 0.275)
| Mix(MBConv1d_P3_H4, 0.208) | Mix(MBConv1d_P5_H4, 0.284) | Mix(MBConv1d_P5_H4, 0.312) | Mix(MBConv1d_P5_H4, 0.359)
| Mix(Zero, 0.340) | Mix(MBConv1d_P5_H4, 0.379) | Mix(MBConv1d_P5_H4, 0.353) | Mix(MBConv1d_P5_H4, 0.386)
| Mix(MBConv1d_P5_H4, 0.304) | Mix(MBConv1d_P5_H4, 0.370) | Mix(MBConv1d_P5_H4, 0.430) | Mix(MBConv1d_P5_H4, 0.475)
| Mix(MBConv1d_P5_H4, 0.273) | Mix(MBConv1d_P5_H4, 0.349) | Mix(MBConv1d_P5_H4, 0.338) | Mix(MBConv1d_P5_H4, 0.369)
| Mix(Zero, 0.286) | Mix(MBConv1d_P5_H4, 0.322) | Mix(MBConv1d_P5_H4, 0.452) | Mix(MBConv1d_P5_H4, 0.444)

Search checkpoint with valid SI SDRi: 12.47 saved.
Total training params: 6,093,781
Total training params: 6,093,780

SYSTEM AND METHOD FOR AUTOMATING DESIGN OF SOUND SOURCE SEPARATION DEEP LEARNING MODEL

CROSS-REFERENCES TO RELATED APPLICATIONS

This application is based on and claims priority under 35 U.S.C. 119 to Korean Patent Application No. 10-2022-0056452, filed on May 9, 2022 in the Korean intellectual property office, the disclosures of which are herein incorporated by reference in their entireties.

TECHNICAL FIELD

The following description relates to a technology for automating the setting of hyper parameters in a sound source separation deep learning model.

BACKGROUND OF THE DISCLOSURE

Recently, with the emergence of a fully convolutional time domain voice separation network (Conv-TasNet) that is a sound source separation deep learning model, sound source separation performance has been greatly advanced. Accordingly, a sound source separation technology that had an effect for only a specific field, such as music, enables high level sound source separation even for various data. The convolution time domain voice separation network was a model originally issued as a voice separation model due to structural excellence, but is used as a reference model of various acoustic domain sound source separation models in addition to a voice through only a slight change. However, the corresponding model requires the redesign of a deep learning architecture and the modification of a hyper parameter in order to be applied to various domains with the best performance. Such a redesign and modification require a lot of time and computer resources, and have disadvantages in that they may be performed by only a deep learning expert and need to be involved by many persons. Accordingly, in order to derive performance and efficiency of the fully convolutional time domain voice separation network including many hyper parameters, there is a need for a technology capable of automatically performing, through small computing power, the redesign of a deep learning model that requires computing resources and the intervention of a person.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments may provide a method and system for searching for a combination of hyper parameters of a separation model consisting of a sound source separation deep learning model through a neural architecture search algorithm.

Embodiments may provide a method and system for reconstructing a sound source separation deep learning model through a combination of hyper parameters searched for with respect to a separation model.

In various embodiments, a method of automating a design of a sound source separation deep learning model, which is performed by a design automation system, may include automatically searching for a combination of hyper parameters of a separation model constructed in a sound source separation deep learning model by using a neural architecture search (NAS) algorithm and reconstructing the sound source separation deep learning model based on the retrieved combination of the hyper parameters of the separation model.

The sound source separation deep learning model may be a fully convolutional time domain voice separation network (Conv-TasNet), the separation model constructed in the sound source separation deep learning model may include a plurality of repeats, each of the plurality of repeats may include a plurality of TCN blocks, and the plurality of TCN blocks may include a layer (Bottleneck) that adjusts the number of channels of an input on which convolution is to be performed by a D-CNN and a layer (depth-wise convolutional network (CNN)) that performs a convolution operation.

Searching for the combination may include forming a search space of the separation model based on a kernel size P and channel expansion ratio H of the separation model.

Searching for the combination may include performing NAS by adjusting the number of layers for each repeat based on a search space of the formed separation model.

Searching for the combination may include constructing one layer by using candidate operations in the formed search space of the separation model and an architecture parameter that assigns a weight to each of the candidate operations, learning a weight and the architecture parameter of the candidate operation in a model architecture generated by using the constructed one layer, by using a training set and a validation set, respectively, and obtaining a model architecture by selecting only one candidate operation in which results of the architecture parameter are the highest as the training of the generated model architecture is completed by using the constructed one layer.

Searching for the combination may include obtaining a model architecture through training using any one parameter, among the weight parameter or the architecture parameter of the candidate operation, by using a binary gate algorithm that forces only one path to be recorded on a GPU memory.

Searching for the combination may include extracting a feature vector for each repeat constructed in the separation model through an auxiliary loss operation, calculating a loss by the number of plurality of repeats constructed in the separation model by calculating a loss for the extracted feature vector, and calculating a final loss by calculating an average of results of the calculated loss.

There is proposed a non-transitory computer-readable recording medium storing instructions that, when executed by a processor, cause the processor to perform the method of automating the design of the sound source separation deep learning model in the design automation system.

In an embodiment, a design automation system may include a hyper parameter combination search unit configured to automatically search for a combination of hyper parameters of a separation model constructed in a sound source separation deep learning model by using a neural architecture search (NAS) algorithm and a model reconstruction unit configured to reconstruct the sound source separation deep learning model based on the retrieved combination of the hyper parameters of the separation model.

The sound source separation deep learning model may be a fully convolutional time domain voice separation network (Conv-TasNet), the separation model constructed in the sound source separation deep learning model may include a plurality of repeats, each of the plurality of repeats may include a plurality of TCN blocks, and the plurality of TCN blocks may include a layer (Bottleneck) that adjusts the number of channels of an input on which convolution is to be performed by a D-CNN and a layer (depth-wise convolutional network (CNN)) that performs a convolution operation.

The hyper parameter combination search unit may form a search space of the separation model based on a kernel size P and channel expansion ratio H of the separation model.

The hyper parameter combination search unit may perform NAS by adjusting the number of layers for each repeat based on a search space of the formed separation model.

The hyper parameter combination search unit may construct one layer by using candidate operations in the formed search space of the separation model and an architecture parameter that assigns a weight to each of the candidate operations, may learn a weight and the architecture parameter of the candidate operation in a model architecture generated by using the constructed one layer, by using a training set and a validation set, respectively, and may obtain a model architecture by selecting only one candidate operation in which results of the architecture parameter are the highest as the training of the generated model architecture is completed by using the constructed one layer.

The hyper parameter combination search unit may obtain a model architecture through training using any one parameter, among the weight parameter or the architecture parameter of the candidate operation, by using a binary gate algorithm that forces only one path to be recorded on a GPU memory.

The hyper parameter combination search unit may extract a feature vector for each repeat constructed in the separation model through an auxiliary loss operation, may calculate a loss by the number of plurality of repeats constructed in the separation model by calculating a loss for the extracted feature vector, and may calculate the final loss by calculating an average of results of the calculated loss.

It is possible to automatically search for a combination of hyper parameters of a sound source separation deep learning model that is optimized for acoustic data and a sound source separation problem to which a separation model is to be applied, while minimizing the intervention of a person.

A combination of the best hyper parameters can be searched for from the existing sound source separation deep learning model, and can be provided to have the best performance with a minimum model size.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments are described in detail with reference to the accompanying drawings.

In an embodiment, an operation of improving performance and efficiency of a model is described by applying, to a sound source separation deep learning model, neural architecture search (NAS) for automating the setting of hyper parameters. The sound source separation deep learning model includes one or more hyper parameters, and can improve efficiency, such as performance and a calculation latency time of a model and the amount of a memory used, depending on the setting of hyper parameters. A task for finding a combination of the best hyper parameters requires a lot of time and computing resources, such as a workstation and graphic cards. Accordingly, in an embodiment, a deep learning model most optimized for a specific acoustic-related problem to which the deep learning model will be applied is to be automatically designed through an operation of automatically search for a combination of the best hyper parameters by a person although the person is not a deep learning expert.

Figure 1:
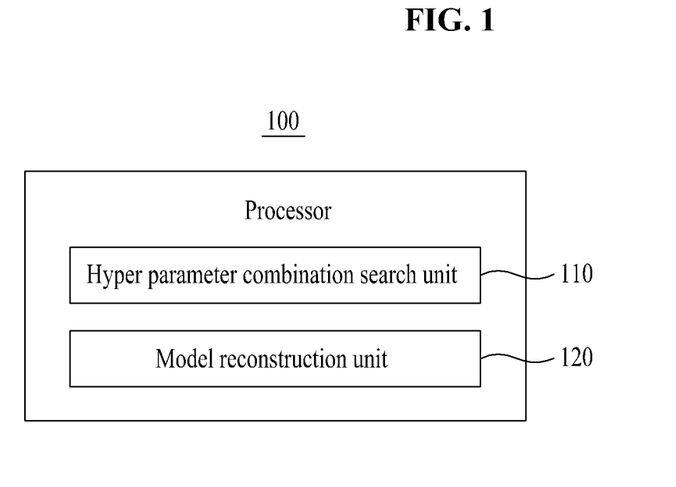
FIG. 1 is a block diagram for describing a construction of a design automation system in an embodiment.
Figure 2:
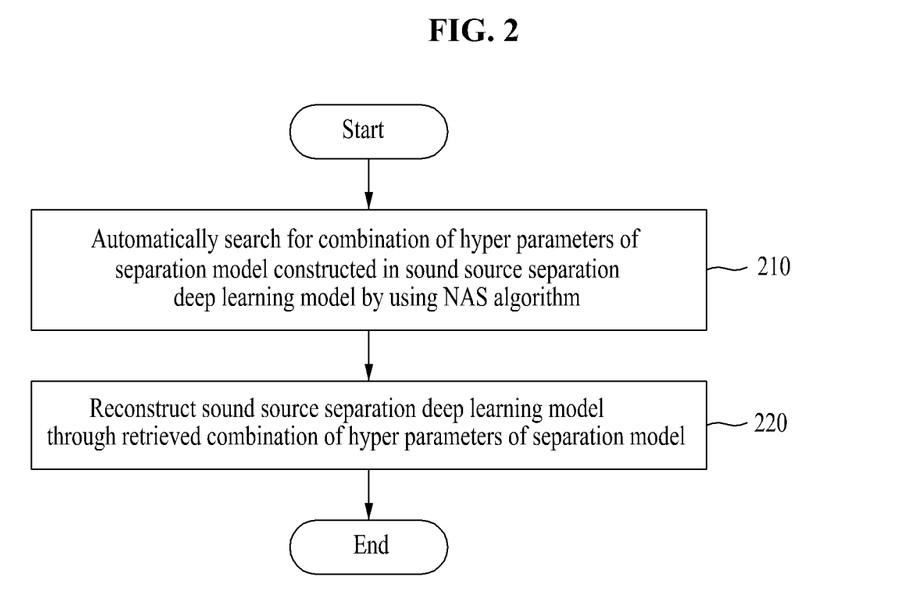
FIG. 2 is a flowchart for describing a method of automating the design of a deep learning model in the design automation system in an embodiment.

FIG. 1 is a block diagram for describing a construction of a design automation system in an embodiment. FIG. 2 is a flowchart for describing a method of automating the design of a deep learning model in the design automation system in an embodiment.

A processor 100 of the design automation system may include a hyper parameter combination search unit 110 and a model reconstruction unit 120. Such components of the processor may be expressions of different functions that are performed by the processor in response to a control command that is provided by a program code stored in the design automation system. The processor and the components of the processor may control the design automation system to perform steps 210 and 220 that are included in the method of automating the design of a deep learning model in FIG. 2. In this case, the processor and the components of the processor may be implemented to execute an instruction according to a code of an operating system and a code of at least one program which is included in a memory.

The processor may load, onto the memory, a program code that is stored in a file of a program for the method of automating the design of a deep learning model. For example, when the program is executed by the design automation system, the processor may control the design automation system to load the program code from the file of the program to the memory under the control of the operating system. In this case, each of the hyper parameter combination search unit 110 and the model reconstruction unit 120 may be a different functional expression of the processor for subsequently executing steps 210 and 220 by executing an instruction of a corresponding part of the program code loaded onto the memory.

In step 210, the hyper parameter combination search unit 110 may automatically search for a combination of hyper parameters of a separation model constructed in a sound source separation deep learning model by using a neural architecture search (NAS) algorithm. For example, the hyper parameter combination search unit 110 may select a separation model among an auto encoder and the separation model that are constructed in the sound source separation deep learning model. In an embodiment, the application of NAS to only the separation model is described in order to limit the complexity of the execution of the NAS.

In this case, the sound source separation deep learning model may be a fully convolutional time domain voice separation network (Conv-TasNet). In order to derive performance and efficiency of the fully convolutional time domain voice separation network (Conv-TasNet) consisting of multiple hyper parameters, a deep learning model needs to be redesigned. In order to redesign the deep learning model, many computing resources and the intervention of a person are required. In order to solve such a problem, NAS, that is, a technology for searching for the best deep learning model through various algorithms, has emerged, and a model retrieved by the NAS shows good performance, which has been in the spotlight. The NAS is a technology for enabling the design of a model, which requires a lot of time and attempts, to be automatically performed. In an embodiment, there is described an operation of searching for a combination of hyper parameters of the fully convolutional time domain voice separation network (Conv-TasNet), which are optimized for data, when the fully convolutional time domain voice separation network (Conv-TasNet) that has greatly influenced the sound source separation field is used as a sound source separation model through NAS by using the fully convolutional time domain voice separation network (Conv-TasNet) as a reference model.

The greatest characteristic of the fully convolutional time domain voice separation network (Conv-TasNet) and a difference between the Conv-TasNet and another model is that the fully convolutional time domain voice separation network (Conv-TasNet) is an end-to-end system in which the input and output of the corresponding model does not experience specific pre-processing and post-processing. The existing sound source separation models are models in which a feature vector through pre-processing in a sound source is used as an input and the output of the separation model is a feature of each sound source to be separated, like spectrogram. The previous models basically include two problems. First, a high resolution feature vector needs to be extracted for the first high separation performance. This requires high latency and is difficult to be applied to real-time sound source separation. Second, there is an upper limit to performance because a loss occurs in restoring (inverse-transforming) a separated feature vector in the form of a sound source again. In order to overcome the disadvantages of the existing methods, the end-to-end system in which a sound source on which pre-processing is not performed is used as an input has been started to be in the spotlight. The fully convolutional time domain voice separation network (Conv-TasNet) was a model originally issued as a voice separation model due to structural excellence among end-to-end models, but is used as a reference model of sound source separation models in various acoustic domains in addition to a voice, through only a slight change.

Figure 3:
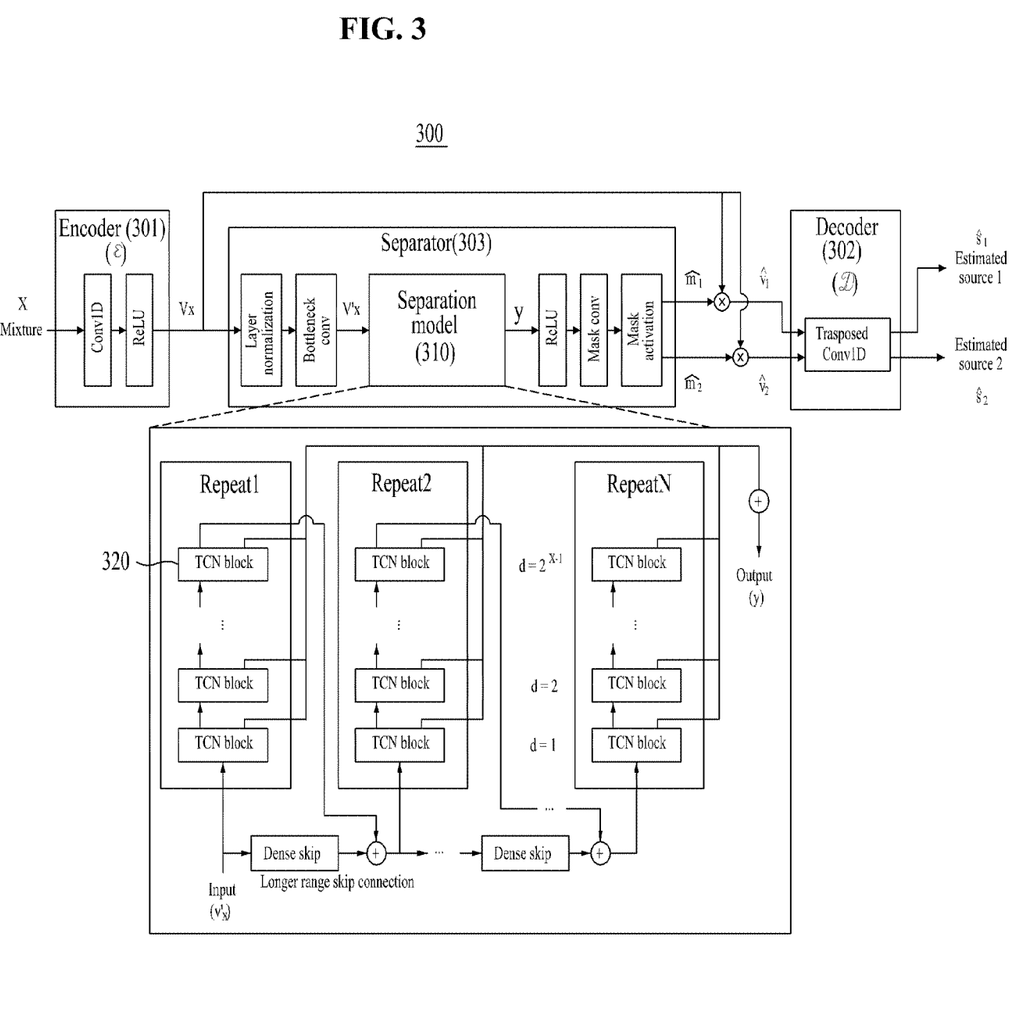
FIG. 3 is an example for describing the architecture of a sound source separation deep learning model in an embodiment.

FIG. 3 is a diagram illustrating the architecture of the fully convolutional time domain voice separation network (Conv-TasNet). The fully convolutional time domain voice separation network (Conv-TasNet) 300 may include an auto encoder 301, a decoder 302, and a separator 303. The separator 303 includes a separation model 310. The fully convolutional time domain voice separation network (Conv-TasNet) 300 includes all layers composed of a 1-D convolutional neural network. In an operation process of the fully convolutional time domain voice separation network (Conv-TasNet) 300, a sound source is converted into a latent vector through the encoder 301. The converted latent vector is input to the separation model 310. The separation model 310 plays a role of estimating a mask vector as many as the number of sound sources to be separated. After the mask vector estimated as many as the number of sound sources is applied to the latent vector, the latent vector to which the mask vector has been applied is converted into the sound source by applying the latent vector to the decoder 302.

More specifically, an input is a mixture of T samples and a sound $x \in \mathbb{R}^{1 \times T}$ in a time domain. First, the encoder 301 ($\varepsilon$) may convert the input mixed signal x into a latent expression $v_x = \varepsilon(x) \in \mathbb{R}^{C_t \times L}$. As a result, the separator 303 (s) assumes the latent mixed expression as an input thereto. A mask $\hat{m}_i \in \mathbb{R}^{C_t \times L}$ corresponding to N sources $s_1, \ldots, s_N \in \mathbb{R}^T$ that constitute a latent mixture may be estimated. An estimated latent expression for each source of a latent space $\hat{v}_i$ may be searched for by multiplying the estimated mask $\hat{m}_i$ for each element and the encoded mixed expression $v_x$. Finally, the reconstruction of each source $\hat{s}_i$ may be obtained by using the decoder 302 ($\mathcal{D}$), and a latent space source estimation may be converted into a time domain $\hat{s}_i = \mathcal{D}(\hat{v}_i)$ again.

Figure 4:
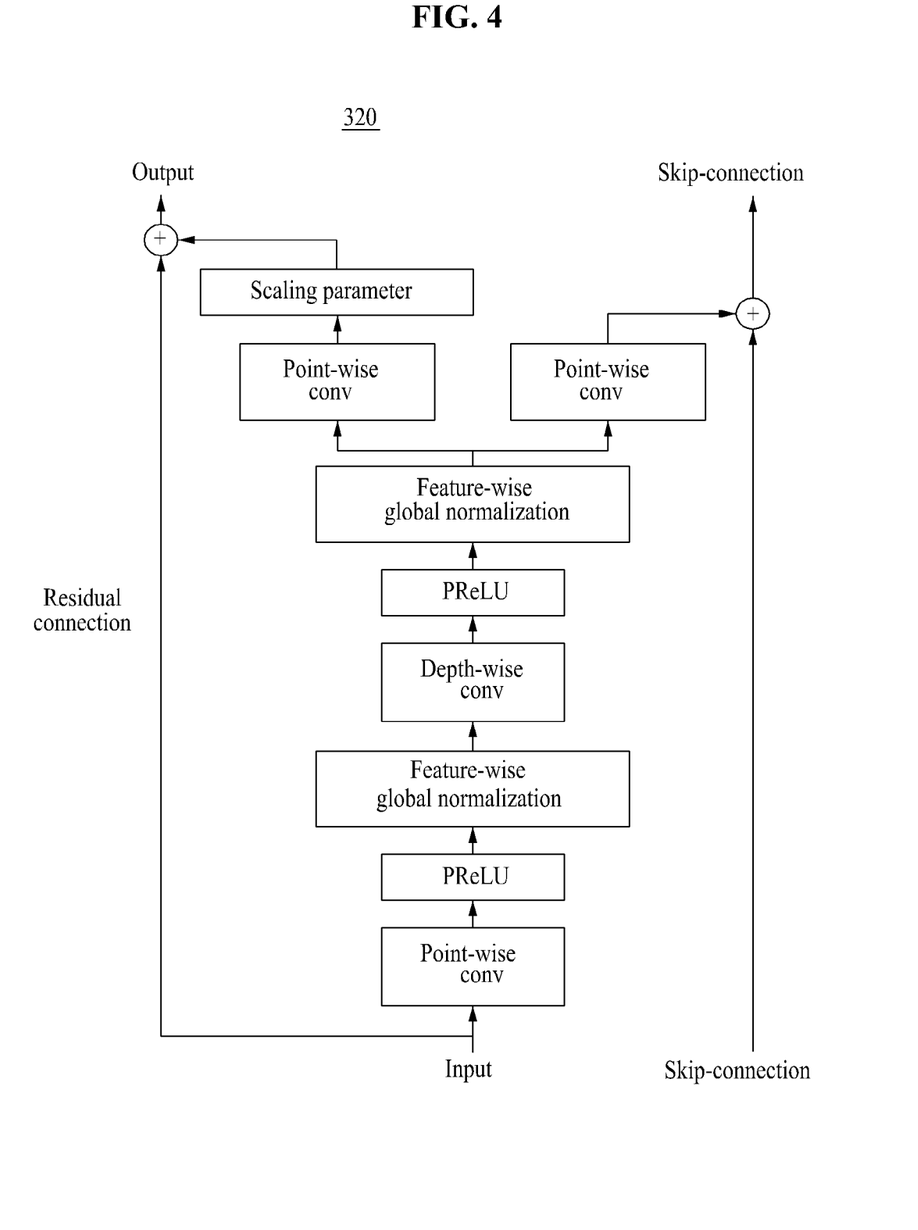
FIG. 4 is a diagram for describing a construction of a TCN block in an embodiment.

The separation model 310 includes a plurality of repeats. Each of the plurality of repeats may include a plurality of TCN blocks 320. FIG. 4 is a diagram for describing the architecture of the TCN block 320. The TCN block 320 has the dilation of a wider kernel as a layer is repeated. The TCN block 320 may have a 1-D convolutional layer in which an expansion coefficient d increases. X convolutional blocks having expansion coefficients $1, 2, 4, \ldots, 2^{X-1}$ in the separation model 310 are repeated R times. The TCN block 320 may include a residual connection and a skip-connection path. The residual connection path transmits the input of a TCN block to a next TCN block. Skip connection paths of all TCN block may be summed and used as the output of the separation model 310. The TCN block 320 includes convolution that is separable for each depth. The convolution is an operator for separating a standard convolution operation for each point and for each depth convolution.

Figure 6:
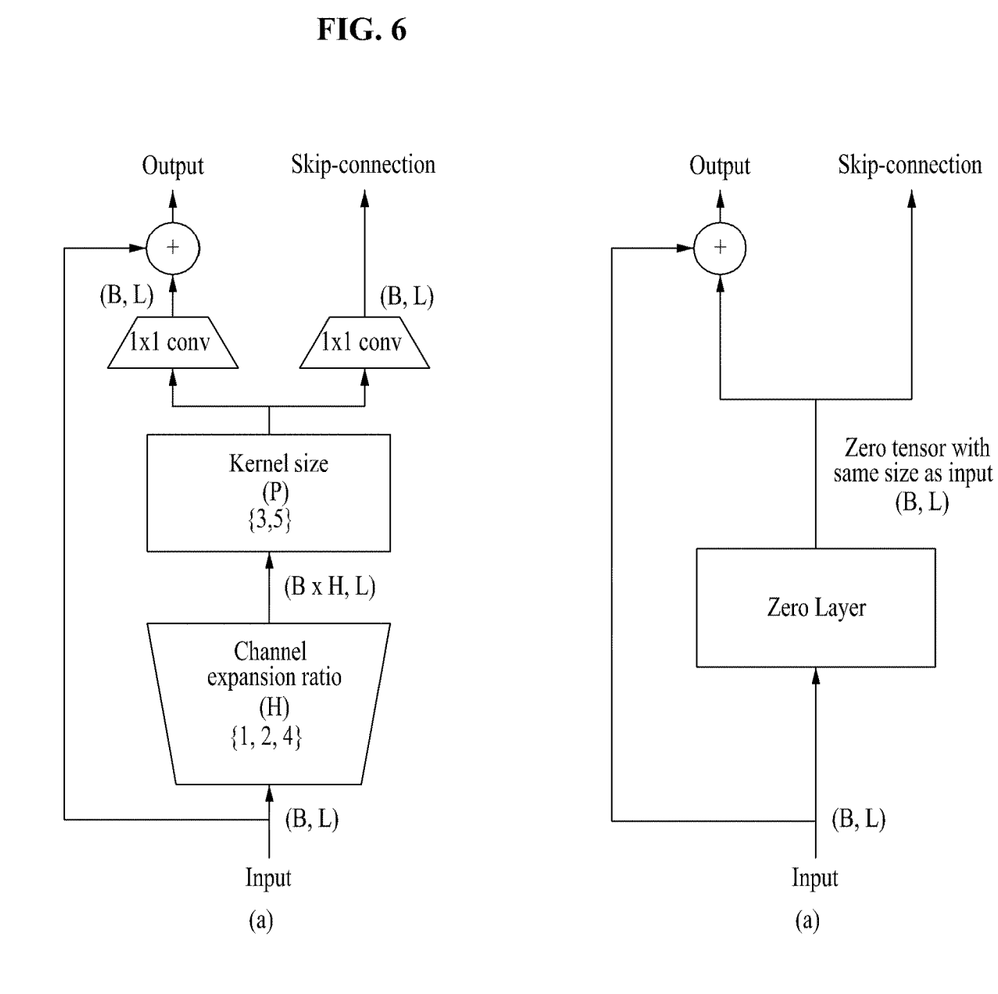
FIG. 6 is a diagram for describing a construction of a search space in an embodiment.

The TCN block 320 may include a Bottleneck and a Depth-wise Convolutional Network (D-CNN). The Bottleneck is a layer that plays a role of adjusting the number of channels of an input on which convolution will be performed by the D-CNN. The D-CNN is a layer that performs a convolution operation. In order to perform NAS, a search space that enables an NAS algorithm to select one of several choices needs to be formed. The search space is a choice that is given to the NAS algorithm. In an embodiment, the search spaces are hyper parameter options of a separation model. The hyper parameter combination search unit 110 may form a search space of a separation model based on a kernel size P and channel expansion ratio H of the separation model. All of the kernel size {3, 5} of the D-CNN, a channel amplification multiple {x1, x2, x4} of the Bottleneck CNN, and the TCN block 320 are characterized in that they have skip connections. Accordingly, although any input is input to the layer, the search space can be designed so that the number of layers can be adjusted by including, in the search space, a zero layer that outputs a zero tensor. The NAS may be performed by forming the search space as the number (1 to 8) of layers for each repeat. FIG. 6 is a diagram for describing a construction of the search space. FIG. 6(*a*) illustrates a TCN block having various kernel sizes and expansion ratios. FIG. 6(*b*) illustrates that a zero layer that controls the depth of a repeat has been added to a candidate operation in order to design NAS for a layer X and a repeat number R. In this case, if the zero layer is disposed between the TCN blocks, the same effect as that one layer is omitted is obtained. For example, a mixed operation may include two cases for a kernel size, three cases for a TCN block channel number, and seven candidate operations including the zero layer.

Figure 5:
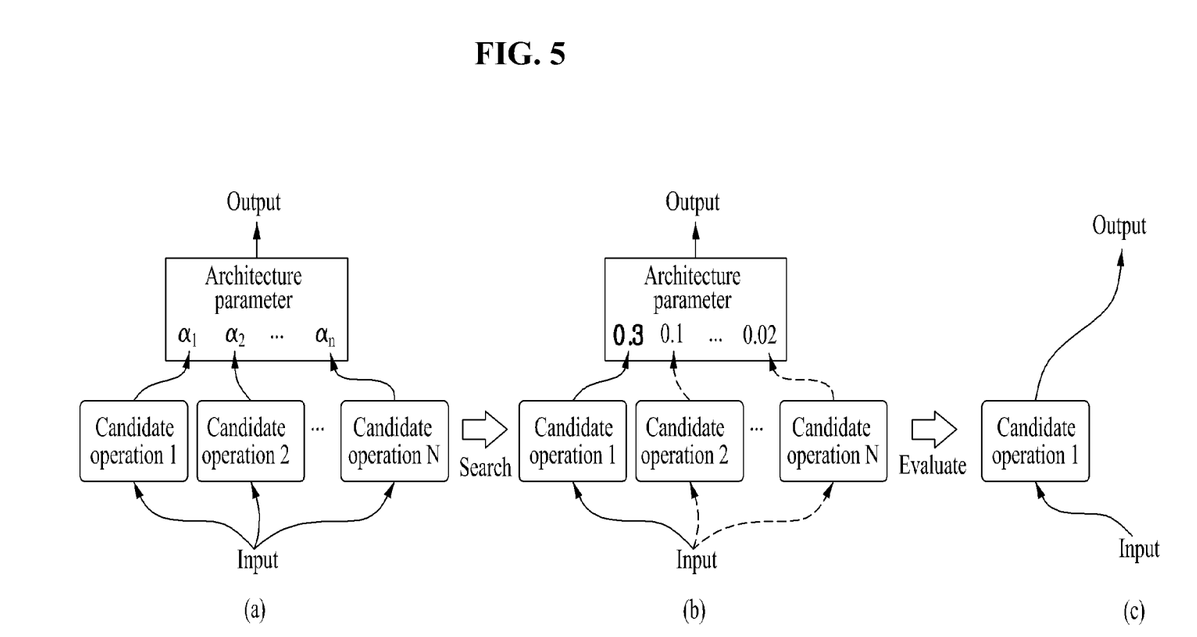
FIG. 5 is a diagram for describing an operation of a DARTS in an embodiment.

For example, the hyper parameter combination search unit 110 may use, as the NAS algorithm, a DARTS(differentiable neural architecture search) based on a gradient descent technique. The hyper parameter combination search unit 110 may construct one layer as architecture parameters that assign a weight to all options (candidate operations) in the aforementioned search space and each of the candidate operations in order to perform the DARTS. In this case, the constructed one layer is written as a cell or a mixed operation. One model architecture consists of a cell. The constructed model architecture may be trained by using a training set and a validation set with respect to a weight parameter of a candidate operation and an architecture parameter, respectively. As the learning (search) of the model architecture consisting of the cell is completed, the model architecture may be obtained by selecting only one candidate operation in which the results of the architecture parameter are the highest. An objective function (two-stage optimization) of a model in which the weight parameter and the architecture parameter are alternately updated can be minimized through the obtained model architecture. As the learning is performed, an architecture parameter value (alpha value) of the mixed operation that improves performance may be increased, and the remaining values may be decreased. After the training of the model, an optimized model architecture may be determined by removing all operations except a candidate operation in which an architecture parameter value (alpha value) of the mixed operation is the greatest. FIG. 5 is a diagram for describing an operation of the DARTS. FIG. 5(*a*) illustrates a cell including candidate operations and architecture parameters assigned to the candidate operations, respectively. FIG. 5(*b*) illustrates that as a model architecture consisting of a cell is trained, the architecture parameter is trained and thus a weight becomes higher in a candidate operation that shows good performance with respect to unseen data. FIG. 5(*c*) illustrates that a model architecture is constructed by leaving only one a candidate operation having the highest weight (architecture parameter). More specifically, search for a cell-based model is performed in a way to search for a calculation cell. The retrieved cell plays a role as a building block of the entire model. The model architecture is represented as $\mathcal{N}(e..., e_n)$. In this case $e_i$ indicates a specific edge of a directed acyclic graph (DAG). In order to construct a model architecture using a cell, each edge is set as the mixed operation $m_\mathcal{O}$ along with a candidate primitive operation set indicated as $\mathcal{O}=\{o_i\}$. The model architecture consisting of the cell is $\mathcal{N}(e=m_\mathcal{O}^1, \ldots, e_n=m_\mathcal{O}^n)$. When the mixed operation and the input are defined as x and $m_\mathcal{O}$, respectively, in the DARTS, $m_\mathcal{O}(x)$ is the weighted sum of $\{o_i(x)\}$. In this case, the weight may be calculated by applying softmax to N real value architecture parameters $\alpha_i$.

$$m_\mathcal{O}(x) = \sum_{i=1}^{N} p_i o_i(x) = \sum_{i=1}^{N} \frac{\exp(\alpha_i)}{\sum_j \exp(\alpha_j)} o_i(x). \quad \text{[Equation 1]}$$

Figure 7:
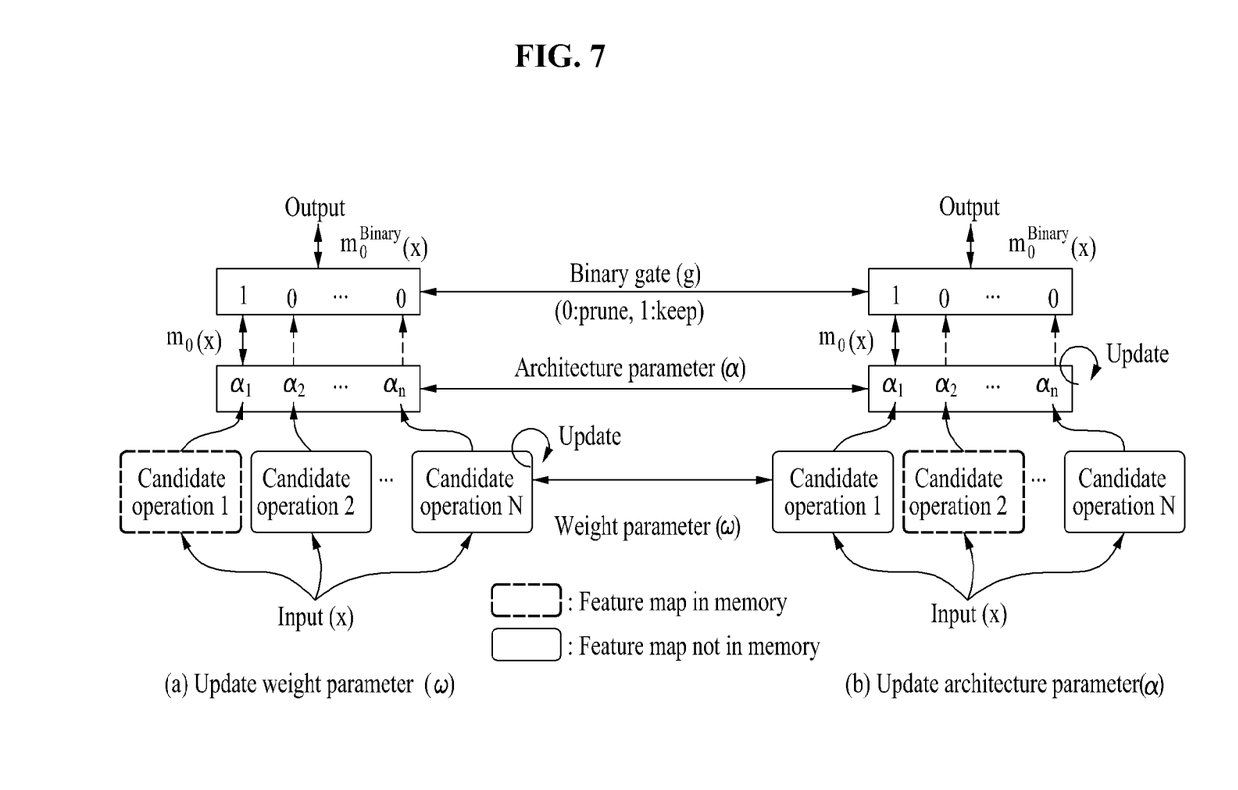
FIG. 7 is a diagram for describing a ProxylessNAS operation in an embodiment.

Furthermore, for example, the hyper parameter combination search unit 110 may use ProxylessNAS as the NAS algorithm. It is difficult to simply apply NAS based on the gradient descent technique because the NAS requires an excessive capacity of a GPU memory. Accordingly, ProxylessNAS, that is, a NAS scheme that efficiently uses a GPU memory, is used. ProxylessNAS is a method of overcoming the excessive use of a memory because the DARTS records operation results of all candidate operations on the GPU memory, and is a method of preventing the excessive use of a GPU by using a binary gate algorithm, that is, a method of forcing only one path to be recorded on the GPU memory as in FIG. 7. The NAS may be applied to a sound source separation deep learning model that directly uses sound source data without pre-processing by overcoming the memory problem through such a method. The path of a memory space can be reduced by maintaining only one path in a model architecture (mixed operation network) that has been excessively parameterized through binarization. A memory installation space can be reduced because only one path is maintained in the model architecture (mixed operation network) in which N real value paths are excessively parameterized through binarization in order to binarize the path. In order to binarize the path, the weight $\{\alpha_i\}$ of the N real value paths may be converted into a binary gate.

$$g = \text{binarize }(p_1, \ldots, p_N) = \begin{cases} [1, 0, \ldots, 0] \\ \ldots \\ [0, 0, \ldots, 1] \end{cases} \quad \text{[Equation 2]}$$

The output of the mixed operation to which the binary gate g has been applied is as follows.

$$m_\mathcal{O}^{Binary}(x) = \sum_{i=1}^{N} g_i o_i(x) = \begin{cases} o_1(x) \\ \ldots \\ o_N(x) \end{cases} \quad \text{[Equation 3]}$$

If the binary gate and the mixed operation are used, only one path may be activated in the memory during run-time. Accordingly, memory requirements for training an excessive parameterized model architecture (mixed operation network) are reduced at the same level as the training of a light-weight model.

Furthermore, an efficient model in which the number of parameters having good performance may be designed when a model architecture is designed through NAS by adding a term in which the size of the model is also taken into consideration in addition to performance when the model is searched for. FIG. 7(*a*) illustrates that only a weight parameter of a candidate operation of an edge that is activated as a binary gate is trained. In order to train the weight parameter, an architecture parameter may be fixed, and the binary gate may be stochastically sampled with respect to each batch of input data. Thereafter, the weight parameter of an active path may be updated through a standard gradient descent technique of a learning data set. FIG. 7(*b*) illustrates that only an architecture parameter of a candidate operation of an edge activated as a binary gate is trained. In order to train the architecture parameter, a weight parameter may be fixed, the binary gate may be reset, and the architecture parameter may be updated in validation separation. Unlike the weight parameter, the architecture parameter cannot be updated by using a normal gradient descent technique because the architecture parameter is not directly related to the calculation of a mixed operation. Nevertheless, the binary gate $\partial m_{\mathcal{O}}^{Binary}(x)/\partial g$ that is related to a calculation graph may be calculated through back propagation as in Equation 3. However, in order to calculate $\partial m_{\mathcal{O}}^{Binary}(x)/\partial g$, the output of the mixed operation $m_{\mathcal{O}}^{Binary}(x)$ needs to be calculated and stored. Accordingly, a task for selecting one path among N candidate paths may be factorized as a multi-binary selection operation, on the assumption that the selected path should be a better choice when solely compared to another path if the selected path is the best choice at a specific location. Two paths may be sampled based on a polynomial distribution $(p_1, \ldots, p_N)$, and all other paths may be masked. As a result, the number of candidates is temporarily decreased from N to 2. This means that the number of paths related to a feature map to be cast in a GPU and a mixed operation is decreased from N to 2. Accordingly, an architecture parameter of the sampled two paths may be updated. The step of updating the weight parameter and the architecture parameter may be alternately performed. When the training of the architecture parameter is completed, a light-weight model architecture can be derived because redundant paths are removed. In other words, the excessive use of a GPU of the DARTS can be reduced by activating and updating only one edge as described above.

Figure 8:
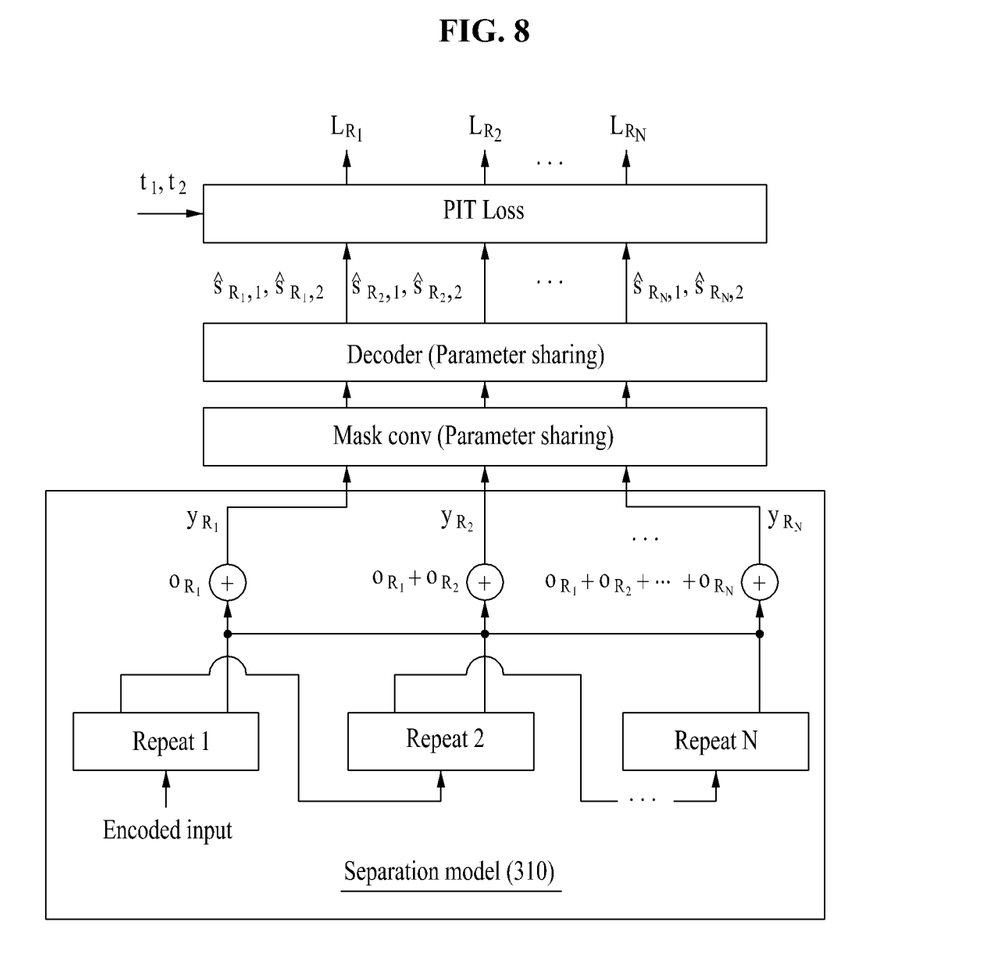
FIG. 8 is a diagram for describing an operation of an auxiliary loss operation in an embodiment.

The hyper parameter combination search unit 110 may use an auxiliary loss operation method. There may occur a phenomenon in which NAS is almost randomly performed on layers that are relatively disposed at a front stage because architecture parameters of the layers are not well trained if the NAS is simply applied to a separation model through the aforementioned exemplary method. In order to overcome such a phenomenon, the auxiliary loss operation method that is used to help the training of a deep (having lots of layers) model. FIG. 8 is a diagram for describing an operation of an auxiliary loss operation. In a conventional technology, the final loss is calculated through a feature vector of the last layer. In contrast, the auxiliary loss operation method is a method of extracting a feature vector for each repeat of a model, calculating a loss by the number of repeats by calculating a loss for the extracted feature vector, and calculating the final loss by calculating an average of the calculated losses.

More specifically, the results of the sum for each element of an output skip connection of each repeat layer is indicated as $y_{R_n}$, and a loss attributable to each repeat is indicated as $L_{R_n}$. If the loss $L_{R_n}$ is used, a loss is calculated by the number of repeats by reusing the existing mask network and decoder without generating an additional model. The losses $L_{R_n}$ may be summed up through an exponential weighted moving average. For example, it is assumed that an initial TCN block repeat has a relatively greater loss than a loss of a subsequent repeat. Accordingly, the influence of a front repeat can be controlled by using a weighted average instead of a normal average. Although the number of repeats is adjusted by using a moving average instead of a simple average, a weighted pattern can be maintained. An auxiliary loss $L_{aux}$ is given as follows.

$$L_{aux} = L_{R_t} = \begin{cases} L_{R_t}, & t = 1 \\ \alpha L_{R_t} + (1-\alpha)L_{R_{t-1}} & t > 1 \end{cases} \quad \text{[Equation 4]}$$

In this case, the coefficient $\alpha$ is a smoothing constant between 0 and 1. When the coefficient $\alpha$ is great, a loss attributable to a previous repeat is further rapidly reduced. The best performance may be monitored when the coefficient $\alpha$ is 0.4. The auxiliary loss is introduced into only the training of a model. A mask is estimated only in the last repeat during inference.

In step 220, the model reconstruction unit 120 may reconstruct a sound source separation deep learning model through the retrieved combination of the hyper parameters of the separation model.

Figure 9:
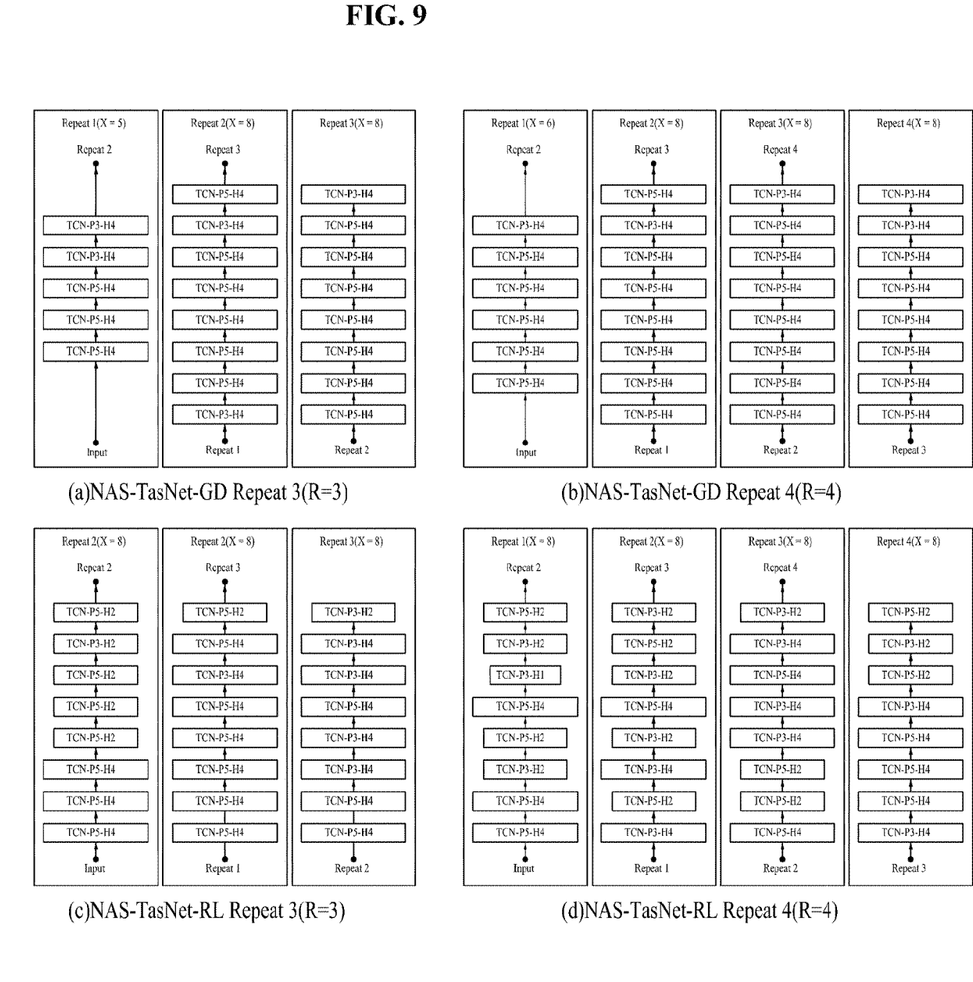
FIGS. 9 and 10 are examples illustrating a model change process in an embodiment.
Figure 10:
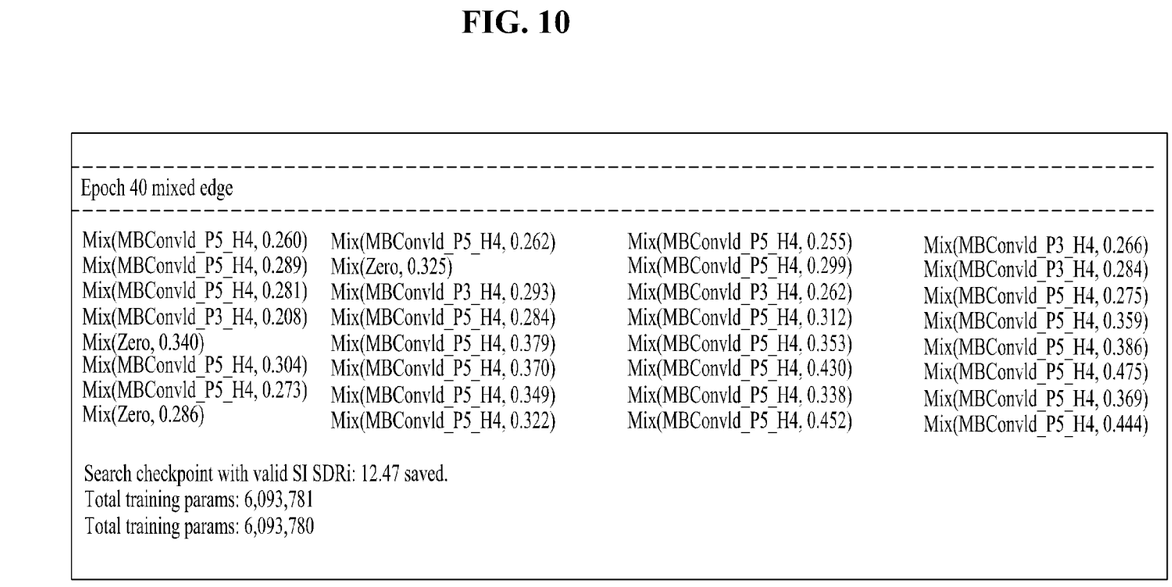

FIGS. 9 and 10 are examples illustrating a model change process in an embodiment.

The aforementioned models specified for voice separation may be searched for when a WSJ0-2mix data set, that is, a voice separation data set, is applied by using the design automation system proposed in an embodiment. FIGS. 9(a) and 9(b) illustrate models retrieved by using the gradient descent technique when the number of repeats of the layer was fixed to 3 or 4, respectively. The model retrieved by using the gradient descent technique is called NAS-TasNet-gradient descent (GD). Furthermore, in an embodiment, a reinforced learning algorithm may also be applied. FIGS. 9(c) and 9(d) illustrate models retrieved by using the reinforced learning algorithm, respectively. The model retrieved by applying reinforced learning is called NAS-TasNet-reinforcement learning (RL). Performance of the retrieved models is as follows.

TABLE 1

| Model | # repeats (R) | Model size | SI-SDRi (dB) | SDRi (dB) |
|---|---|---|---|---|
| Conv-TasNet | 3 | 5.1M | 16.0 (15.3*) | 16.3 (15.6*) |
|  | 4 | 6.7M | 16.3 | 16.6 |
| NAS-TasNet-GD | 3 | 4.5M | 16.7 | 17.0 |
|  | 4 | 6.3M | 17.7 | 18.0 |
| NAS-TasNet-RL | 3 | 4.4M | 17.0 | 17.3 |
|  | 4 | 5.0M | 17.5 | 17.7 |

Contents written in Table 1 are results obtained by performing tests after the models were directly trained from the first. Performance marked as * indicates performance given in a thesis that presented the models. Scale invariant signal to distortion ratio improvement (SI-SDRi) and signal to distortion ratio improvement (SDRi) are scales for measuring separation performance. The retrieved models showed better separation performance than performance given in the thesis of Conv-TasNet or results that were directly trained and obtained. It may be seen that the number of parameters is smaller.

The technology proposed in an embodiment is a program that has been implemented by using python as a program language. Pytorch may be used as a python deep learning framework. It is recommended to use a GPU having performance of RTX 2080ti or more because the GPU is used in this program. First, when an instruction is input as follows after the program moves to a project path, the program may be executed.

```
python main.py --dataset_path=datamodules/wsj0_2mix/
--train_batch_size=2 --valid_batch size=2
--num_search_epoch=40 --num_eval_epoch=150
--search_algo=gd --use_aux_heads
```

```
--use_skip_connection --use_scaling_param
--use_longer_range_skip --norm_type=fgLN
--use_non_linear_act_enc --net_num_max_repeats=4
```

Parameters of the execution instruction are described. "—train_batch_size" and "—valid_batch_size" are parameters indicating how many data will be used to construct a mini batch from a training set and a validation set, respectively. In the case of GPU RTX 2089Ti, up to two mini batches may be set. "—search_algo" is a factor indicating whether to perform NAS through which algorithm. Search using a gradient descent may be performed if the factor is set as "gd", and search using reinforced learning may be performed if the factor is set as "rl". In the case of a factor "—use_aux_heads", the auxiliary loss method is used if the program including the corresponding factor is executed. It is recommended to use all of factors "—use_skip_connection", "—use_scaling_param", "—use_longer_range_skip", "—norm_type=fgLN, and "—use_non_linear_act_enc" as factors that are added in order to use an additional deep learning scheme for performance improvement. A factor "—net_num_max_repeats=4" means that the repeat of the TCN layer of the separation model will be set to 4. It is recommended to use the factor "—net_num_max_repeats=4" in order to search for a model having good performance. If the program is executed by using the instruction, NAS for a separation model is executed. The NAS is performed according to a total of three phases. First, a warm-up phase is executed. The warm-up phase is a process of fixing the architecture parameter, setting parameters of the candidate operation model of the search space so that the parameters are trained, randomly constructing a model every mini batch, and training the model parameter. If the training of the model parameter is performed through the warm-up phase, candidate operations generate discriminating features. In the search process, the architecture parameter can be well trained through the discriminating feature between the candidate operations. When the warm-up phase is terminated, a search phase is automatically performed. The search phase is a process of the architecture parameter and the weight parameter being alternately updated. A model search situation may be output to a console that has executed a code for each epoch as in FIG. 10. Furthermore, the model search situation may be stored in the form of an image as in FIG. 9. The stored images may be converted into a gif file, so that a model change process may be visualized during search. For example, the number of epochs of the search phase may be set to 40 (i.e., "—num_search_epoch=40"). When the search phase is terminated, an evaluation phase for checking the final model performance is performed by using a model retrieved in the search phase. The evaluation phase is a step of constructing a model as an architecture retrieved in the search phase and training the model from the first. When the evaluation phase is terminated, a model trained by a finally retrieved model architecture may be obtained.

The aforementioned device may be implemented as a hardware component, a software component, or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and stored in a computer-readable medium. The computer-readable recording medium may include a program instruction, a data file, and a data structure solely or in combination. The program instruction recorded on the medium may be specially designed and constructed for an embodiment, or may be known and available to those skilled in the computer software field. Examples of the computer-readable recording medium include magnetic media such as a hard disk, a floppy disk and a magnetic tape, optical media such as a CD-ROM and a DVD, magneto-optical media such as a floptical disk, and hardware devices specially configured to store and execute a program instruction, such as a ROM, a RAM, and a flash memory. Examples of the program instruction include not only machine language code produced by a compiler, but a high-level language code which may be executed by a computer using an interpreter, etc.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A method of automating a design of a sound source separation deep learning model, which is performed by a design automation system, the method comprising:
   automatically searching for a combination of hyper parameters of a separation model constructed in a sound source separation deep learning model by using a neural architecture search (NAS) algorithm; and reconstructing the sound source separation deep learning model based on the retrieved, combination of the hyper parameters of the separation model, wherein searching for the combination comprises forming a search space of the separation model based on a kernel size P and channel expansion ratio H of the separation model, wherein searching for the combination comprises:
constructing one layer by using candidate operations in the formed search space of the separation model and an architecture parameter that assigns a weight to each of the candidate operations;
learning a weight and the architecture parameter of the candidate operation in a model architecture generated by using the constructed one layer, by using a training set and a validation set, respectively; and
obtaining a model architecture by selecting only one candidate operation in which results of the architecture parameter are a highest as the training of the generated model architecture is completed by using the constructed one layer, and wherein searching for the combination comprises:
extracting a feature vector for each repeat constructed in the separation model through an auxiliary loss operation;
calculating a loss by the number of plurality of repeats constructed in the separation model by calculating a loss for the extracted feature vector; and
calculating a final loss by calculating an average of results of the calculated loss.

2. The method of claim 1, wherein:
the sound source separation deep learning model is a fully convolutional time domain voice separation network (Conv-TasNet),
the separation model constructed in the sound source separation deep learning model comprises a plurality of repeats,
each of the plurality of repeats comprises a plurality of TCN blocks, and
the plurality of TCN blocks comprises a layer (Bottleneck) that adjusts the number of channels of an input on which convolution is to be performed by a D-CNN and a layer (depth-wise convolutional network (CNN)) that performs a convolution operation.

3. The method of claim 1, wherein searching for the combination comprises performing NAS by adjusting the number of layers for each repeat based on a search space of the formed separation model.

4. The method of claim 1, wherein searching for the combination comprises obtaining a model architecture through training using any one parameter, among the weight parameter or the architecture parameter of the candidate operation, by using a binary gate algorithm that forces only one path to be recorded on a GPU memory.

5. A non-transitory computer-readable recording medium storing instructions that, when executed by a processor, cause the processor to perform the method of claim 1.

6. A design automation system comprising:
a hyper parameter combination search unit configured to automatically search for a combination of hyper parameters of a separation model constructed in a sound source separation deep learning model by using a neural architecture search (NAS) algorithm; and a model reconstruction unit configured to reconstruct the sound source separation deep learning model based on the retrieved combination of the hyper parameters of the separation model, wherein the hyper parameter combination search unit forms a search space of the separation model based on a kernel size P and channel expansion ratio H of the separation model, wherein the hyper parameter combination search unit
constructs one layer by using candidate operations in the formed search space of the separation model and an architecture parameter that assigns a weight to each of the candidate operations,
learns a weight and the architecture parameter of the candidate operation in a model architecture generated by using the constructed one layer, by using a training set and a validation set, respectively, and
obtains a model architecture by selecting only one candidate operation in which results of the architecture parameter are a highest as the training of the generated model architecture is completed by using the constructed one layer, wherein the hyper parameter combination search unit
constructs one layer by using candidate operations in the formed search space of the separation model and an architecture parameter that assigns a weight to each of the candidate operations,
learns a weight and the architecture parameter of the candidate operation in a model architecture generated by using the constructed one layer, by using a training set and a validation set, respectively, and
obtains a model architecture by selecting only one candidate operation in which results of the architecture parameter are a highest as the training of the generated model architecture is completed by using the constructed one layer, and wherein the hyper parameter combination search unit
extracts a feature vector for each repeat constructed in the separation model through an auxiliary loss operation,
calculates a loss by the number of plurality of repeats constructed in the separation model by calculating a loss for the extracted feature vector, and
calculates a final loss by calculating an average of results of the calculated loss.

7. The design automation system of claim 6, wherein:
the sound source separation deep learning model is a fully convolutional time domain voice separation network (Conv-TasNet),
the separation model constructed in the sound source separation deep learning model comprises a plurality of repeats,
each of the plurality of repeats comprises a plurality of TCN blocks, and
the plurality of TCN blocks comprises a layer (Bottleneck) that adjusts the number of channels of an input on which convolution is to be performed by a D-CNN and a layer (depth-wise convolutional network (CNN)) that performs a convolution operation.

8. The design automation system of claim 6, wherein the hyper parameter combination search unit performs NAS by adjusting the number of layers for each repeat based on a search space of the formed separation model.

9. The design automation system of claim 6, wherein the hyper parameter combination search unit obtains a model architecture through training using any one parameter, among the weight parameter or the architecture parameter of the candidate operation, by using a binary gate algorithm that forces only one path to be recorded on a GPU memory.

* * * * *